United States Patent
Maeng

(10) Patent No.: US 9,641,610 B2
(45) Date of Patent: May 2, 2017

(54) METHOD OF MANAGING DIGITAL MEDIA CONTENTS, COMPUTER-READABLE STORAGE MEDIUM FOR RECORDING THE METHOD, AND USER APPARATUS FOR PERFORMING THE METHOD

(71) Applicant: SAMSUNG ELECTRONICS CO., LTD., Suwon-si, Gyeonggi-do (KR)

(72) Inventor: Sook-young Maeng, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 14/088,731

(22) Filed: Nov. 25, 2013

(65) Prior Publication Data

US 2014/0149543 A1    May 29, 2014

(30) Foreign Application Priority Data

Nov. 26, 2012 (KR) .................. 10-2012-0134869

(51) Int. Cl.
*G06F 15/16* (2006.01)
*H04L 29/08* (2006.01)

(52) U.S. Cl.
CPC .................. *H04L 67/1095* (2013.01)

(58) Field of Classification Search
None
See application file for complete search history.

(56) References Cited

U.S. PATENT DOCUMENTS

| | | | | |
|---|---|---|---|---|
| 7,525,578 | B1* | 4/2009 | Barbeau | H04N 9/8205 348/211.2 |
| 2002/0103759 | A1* | 8/2002 | Matsumoto | G06F 21/10 705/51 |
| 2007/0086665 | A1* | 4/2007 | Kim | G06F 17/30038 382/239 |
| 2007/0266093 | A1* | 11/2007 | Forstall | G06F 9/4443 709/204 |
| 2010/0179874 | A1* | 7/2010 | Higgins | G06K 9/00664 705/14.53 |
| 2012/0166922 | A1 | 6/2012 | Rolles | |
| 2012/0284802 | A1* | 11/2012 | Hierro | G06F 21/10 726/27 |

OTHER PUBLICATIONS

"Mirroring." Nov. 6, 2007, http://www.metamorphosite.com/use-online-file-storage-to-upload-for-file-sharing.*

* cited by examiner

*Primary Examiner* — Brian Whipple
*Assistant Examiner* — Gregory P Tolchinsky

(57) ABSTRACT

A method for managing digital media content is described. Digital media content is uploaded to a server by a user apparatus. Access information about the server is stored in a digital media content file in which the digital media content is stored.

13 Claims, 15 Drawing Sheets

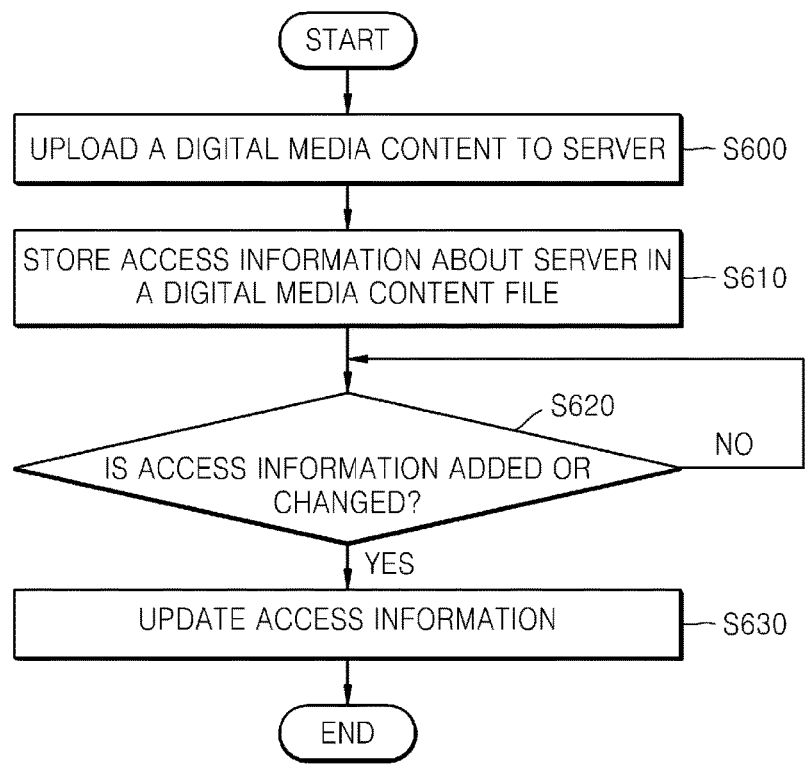
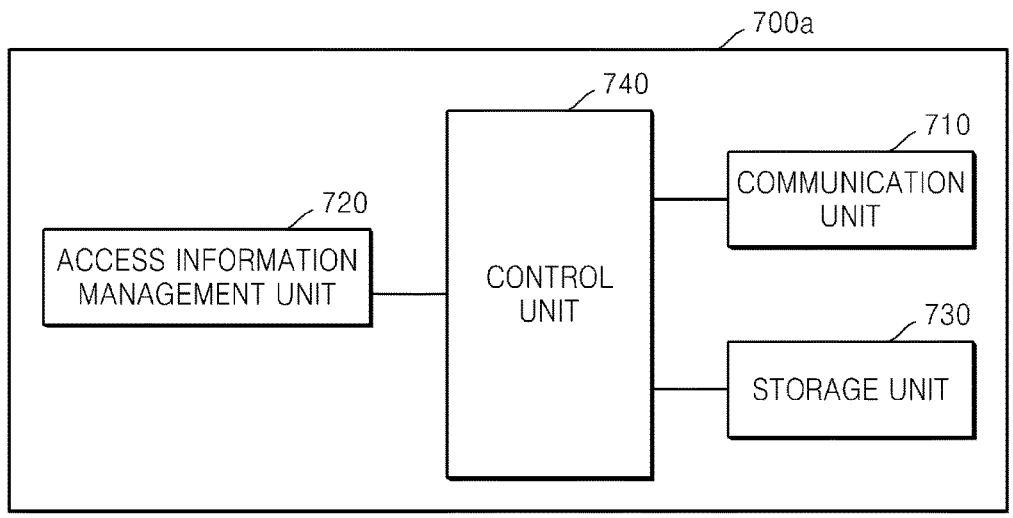

METHOD OF MANAGING DIGITAL MEDIA CONTENTS, COMPUTER-READABLE STORAGE MEDIUM FOR RECORDING THE METHOD, AND USER APPARATUS FOR PERFORMING THE METHOD

RELATED APPLICATIONS

This application claims the priority benefit under 35 U.S.C. §119(a) from Korean Patent Application No. 10-2012-0134869, filed on Nov. 26, 2012, in the Korean Intellectual Property Office, the disclosure of which is incorporated herein by reference in its entirety.

BACKGROUND

1. Field

Various embodiments relate to a method of managing digital media contents, a computer-readable storage medium for recording the method, and a user apparatus for performing the method.

2. Related Art

A social network service (SNS) is a service in which people may form personal relationships with other people online. SNS users may make new acquaintances or enhance their existing personal relationships through the SNS. Due to the spread of smart phones, an item of digital media content may be easily uploaded to various web pages on the internet such as an SNS server.

SUMMARY

One or more embodiments of the present disclosure include a method of storing access information about a server, to which content is uploaded, in a content file for storing content, and easily and quickly transferring the content to the corresponding server to which the content is uploaded in any apparatus that may upload the content to the server so that the content uploaded to the server may be searched for, instead of employing a method using a specific content management system.

One or more embodiments of the present disclosure include a method of, if content is changed, easily synchronizing the content uploaded to at least one or more servers by using access information stored in the content file.

Additional features will be set forth in part in the description which follows and, in part, will be apparent from the description, or may be learned by practice of the presented embodiments.

According to one or more embodiments, a method of managing digital media content includes: uploading, by a user apparatus, the digital media content to a server; and storing access information about the server in a digital media content file in which the digital media content is stored The method may further include accessing a web page of the server by using the access information; and displaying the web page.

The access information may include at least one of a number of servers to which the digital media content has been uploaded and an address of each server to which the digital media content is uploaded.

The method may further include, if the digital media content is changed, providing information about the digital media content change to the server by using the access information.

The information about the digital media content change may include information about at least one of the changed digital media content, an update version, or a latest update time.

The method may further include additionally uploading the digital media content to another server, or deleting the uploaded digital media content from the server; and updating the access information stored in the digital media content file.

The method may further include filtering a plurality of digital media content files based on the access information.

According to one or more embodiments, a user apparatus for managing digital content includes: a communication unit for uploading digital media content to a server; and an access information management unit for storing access information about the server in a digital media content file in which the digital media content is stored.

The user apparatus may further include a server access unit for accessing a web page of the server by using the access information; and a display unit for displaying the web page.

The access information about the server may include at least one of a number of servers to which the digital media content is uploaded or an address of the servers to which the digital media content is uploaded.

The user apparatus may further include an information update unit for, if the digital media content is changed, providing information about the digital media content change to the server by using the access information.

The information about the digital media content change may include information about at least one of the changed digital media content, an update version, or a latest update time.

If the content is additionally uploaded to another server or the uploaded digital media content is deleted from the server, the access information management unit may update the access information stored in the digital media content file.

The user apparatus may further include a control unit for filtering the digital media content file according to the access information.

According to one or more embodiments, there is provided a computer-readable recording medium for storing computer program code which performs the method uploading, by a user apparatus, the digital media content to a server; and storing access information about the server in a digital media content file in which the digital media content is stored.

BRIEF DESCRIPTION OF THE DRAWINGS

These and/or other aspects will become apparent and more readily appreciated from the following description of the embodiments, taken in conjunction with the accompanying drawings in which:

FIG. 6 is a flowchart illustrating a method of managing, by the user apparatus, digital media content if there is a change in the server to which the digital media content has been uploaded, according to another embodiment;

FIG. 7 is a block diagram illustrating a user apparatus for managing digital media content, according to an embodiment;

DETAILED DESCRIPTION

Figure 1:
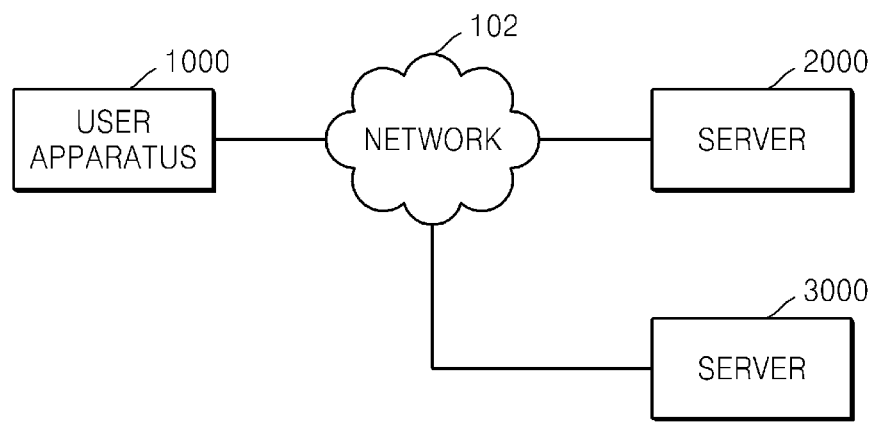
FIG. 1 is a block diagram illustrating a system for uploading digital media content from a user apparatus to a server, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As embodiments of the invention allow for various changes and numerous alternative embodiments, particular embodiments will be illustrated in the drawings and described in detail in the written description. Numerous modifications and adaptations will be readily apparent to those of ordinary skill in this art without departing from the spirit and scope of the invention as defined by the claims.

While such terms as "first," "second," etc., may be used to describe various components, such components may not be limited to the above terms. The above terms are used only to distinguish one component from another.

The terms used in the present specification are merely used to describe particular embodiments, and are not intended to limit embodiments of the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, various embodiments will be described in more detail with reference to the accompanying drawings. Those components that are the same or are in correspondence are rendered the same reference numeral regardless of the figure number, and redundant explanations are omitted.

FIG. 1 is a block diagram illustrating a system for uploading digital media content from a user apparatus 1000 to a server 2000, according to an embodiment.

As illustrated in FIG. 1, the system may include the user apparatus 1000 and the server 2000. The system may further include one or more additional instances of the server 2000, such as the server 3000. Hereinafter, digital media content will be referred to as content.

The user apparatus 1000 is a device for uploading content to the server 2000. The user apparatus 1000 may also be a device for displaying content that has been uploaded to the server 2000 (e.g., uploaded content) to a user.

The user apparatus 1000 may be implemented in various forms. The user apparatus 1000, described herein, may include a desktop computer, a cellular phone, a smart phone, a laptop computer, an apparatus for digital broadcasting, a personal digital assistant (PDA), a portable multimedia player (PMP), a navigation device, a tablet personal computer (PC), an MP3 player, a digital camera, digital consumer electronics (CE) equipment, or the like. The digital CE equipment may include a digital television (DTV), an internet protocol television (IPTV), or a refrigerator or air conditioner which has a display device.

The user apparatus 1000 may be connected to the server 2000 via a network 102. Accordingly, the user apparatus 1000 may execute wired or wireless communication with the server 2000 via the network 102. For example, the user apparatus 1000 may transmit contents or various content-related information to the server 2000.

The various content-related information may include information about a change in content or a change in content management information, if such changes occur. According to an embodiment, the various content-related information may include at least one of server connection information or content change information.

The server 2000, according to an embodiment, may be a social network service (SNS) server. The SNS server is a server for providing an SNS. If the server 2000 is an SNS server, the user apparatus 1000 may be an apparatus of a user who subscribes to the SNS. The server 2000 may also be a cloud service server or a media service server. The user apparatus 1000 may upload content to the server 2000.

Figure 2:
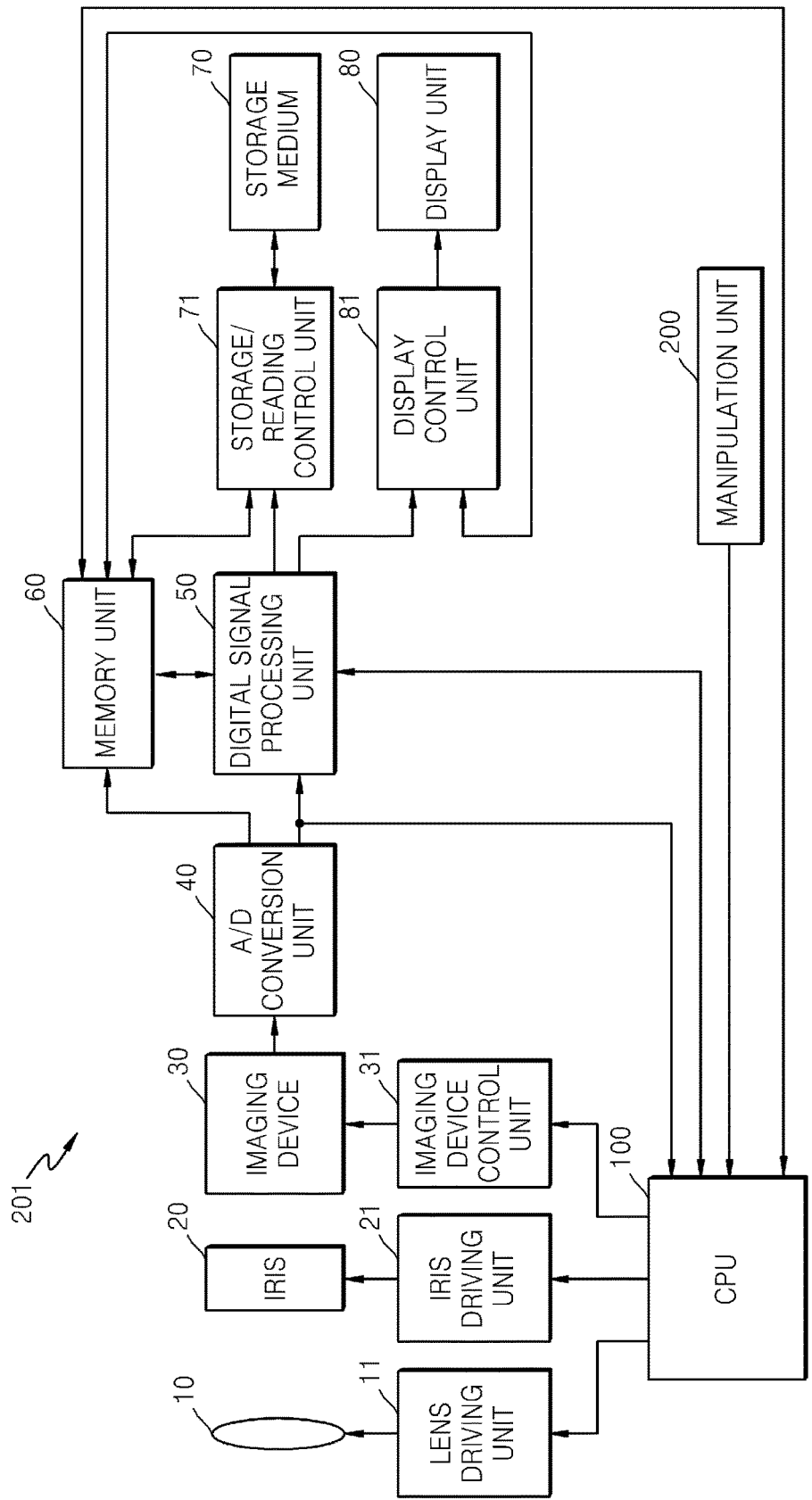
FIG. 2 is a schematic block diagram illustrating a digital photographing apparatus for managing digital media content, according to an embodiment.

FIG. 2 is a schematic block diagram illustrating a digital photographing apparatus 201 which is an example of the user apparatus 1000 for managing digital media content, according to an embodiment.

A central processing unit (CPU) 100 controls various operations of the digital photographing apparatus 201. The digital photographing apparatus 201 includes a manipulation unit 200 which includes a button, or the like, for generating an electrical signal based on input from a user. An electrical signal from the manipulation unit 200 is transmitted to the CPU 100 so that the CPU 100 may control the digital photographing apparatus 201 based on the electrical signal.

In a case of a photographing mode of the digital photographing apparatus 201, when the electrical signal is applied to the CPU 100, the CPU 100 may control a lens driving unit 11, an iris driving unit 21, and an imaging device control unit 31. Thus, one or more of a location of a lens 10, a degree of opening or closing of an iris 20, or a sensitivity of an imaging device 30 are controlled. The imaging device 30 generates image data from received light. An analog-to-digital (A/D) conversion unit 40 converts analog data, output from the imaging device 30, to digital data. According to characteristics of the imaging device 30, the A/D conversion unit 40 may be omitted.

The data, output from the imaging device 30 (or the A/D conversion unit 40), may be input to a digital signal processing unit 50 via a memory unit 60 or directly without passing through the memory unit 60. In some implementations, the data may be input to the CPU 100. The memory unit 60 herein includes read-only memory (ROM) or random-access memory (RAM). The digital signal processing unit 50 may perform image signal processing, such as gamma correction or white balance adjustment.

Image data, output from the digital signal processing unit 50, is transmitted to a display control unit 81 via the memory unit 60 or directly. The display control unit 81 controls a display unit 80 so as to display an image on the display unit 80. The image data, output from the digital signal processing unit 50, is input to a storage/reading control unit 71 via the memory unit 60 or directly. The storage/reading control unit 71 stores the image data in a storage medium 70, according to a signal from a user or automatically. The storage/reading control unit 71 reads data regarding an image from an image file stored in the storage medium 70, and inputs the data to the display control unit 81 via the memory unit 60 or via a different path so that the image may be displayed on the display unit 80. The recording medium 70 may be detachably attached to or permanently mounted in the digital photographing apparatus 201.

The digital photographing unit 201 generates image data from light which passes through the lens 10 and is incident on the imaging device 30. The digital photographing unit 201 may then store a digital image file, which contains the image data, in the recording medium 70.

The digital photographing apparatus 201 of FIG. 2 is an example of the user apparatus 1000 for managing content in various embodiments; however embodiments of the invention are not limited to the digital photographing apparatus 201 of FIG. 2.

Figure 3:
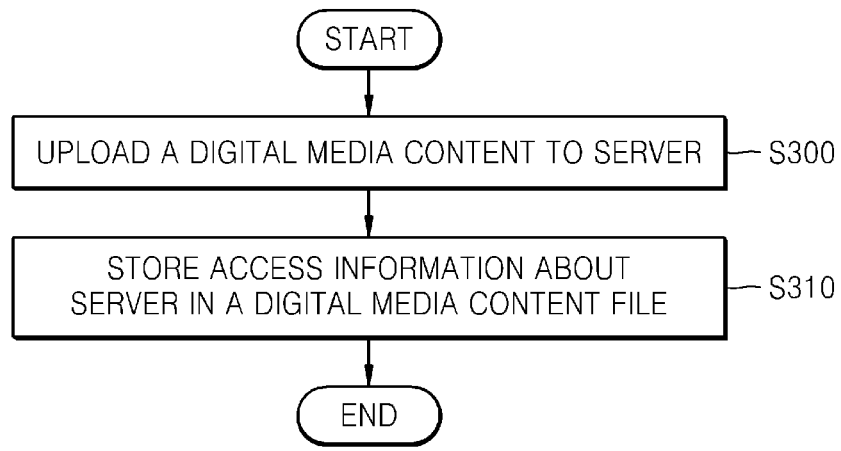
FIG. 3 is a flowchart illustrating a method of managing digital media content by using content management information, according to an embodiment.

FIG. 3 is a flowchart illustrating a method of managing digital media content by using content management information, according to an embodiment.

In operation S300, the user apparatus 1000 may upload content to the server 2000.

According to an embodiment, the content may include at least one of still image content (e.g., a photograph or a drawing), text content (e.g., a poem, a novel, a letter, a work file, or a detailed description about contents), moving picture content (e.g., a personal moving picture, a movie, a music video, or a TV program image), music content (e.g., music, a tune, or a radio broadcast), or event content (e.g., a schedule, an anniversary day, or a travel plan). The content, according to an embodiment, may include other various types of content, as well as multimedia content. According to an embodiment, content uploaded to the server 2000 may be a content file (e.g., a digital media content file) which includes content management information.

In operation S310, access information about one or more servers may be stored in a content file, in which the content is stored. According to an embodiment, content uploaded to the server 2000 may be a content file which includes content management information. In this case, if the content file fails to be uploaded to the server 2000, access information about the server 2000 which is stored in the content file may be deleted.

Figure 10:
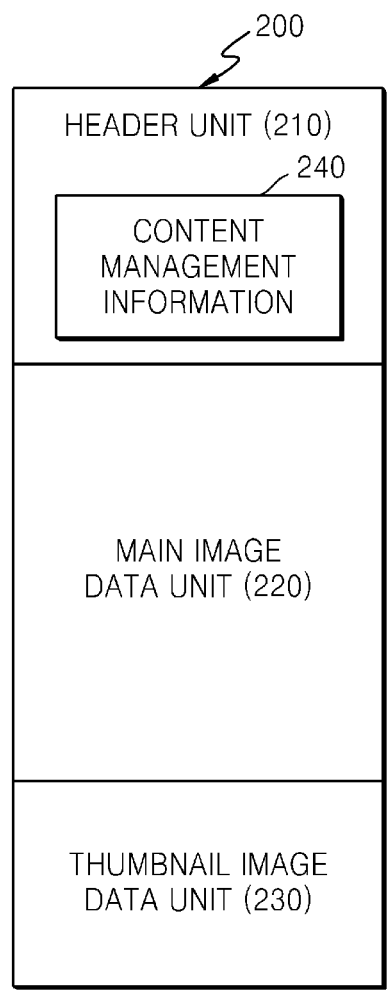
FIG. 10 is a diagram illustrating a configuration of an image content file according to an embodiment, as an example of digital media content.

The user apparatus 1000 may upload (S300) the same content to one or more servers, such as the servers 2000 and 3000. In this case, the access information about the servers 2000 and 3000, according to an embodiment, may include at least one of a number of servers to which contents have been uploaded or addresses of the servers to which the contents have been uploaded. The number of servers refers to the number of servers to which the same content has been uploaded from the user apparatus 1000. The addresses of the servers includes information about a content access path via which the user apparatus 1000 may access the content. An example of storing access information in a content file in operation S310 is shown in FIG. 10.

Figure 4:
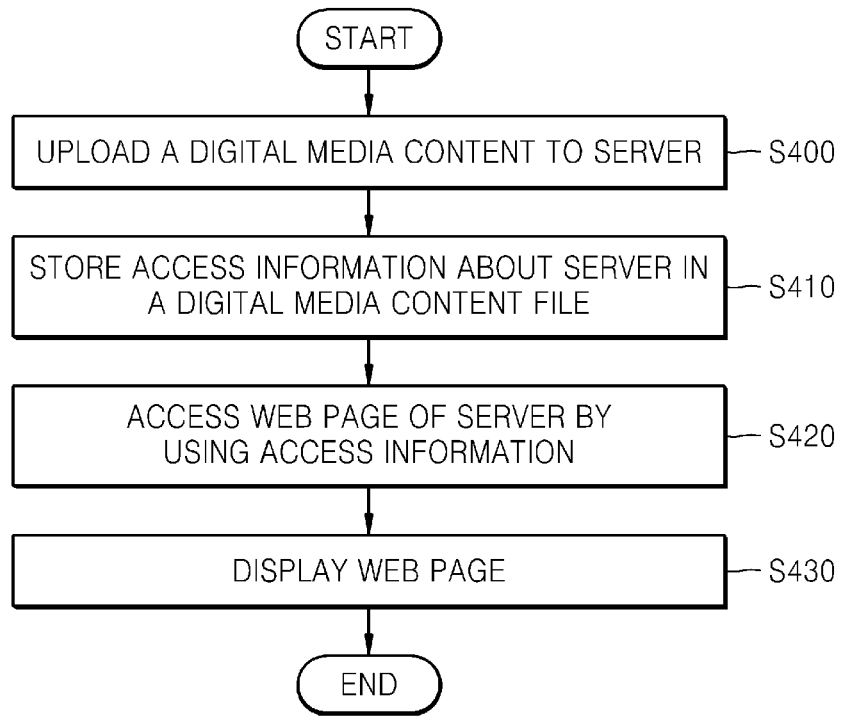
FIG. 4 is a flowchart illustrating a method of displaying a web page to which the digital media content has been uploaded by the user apparatus of FIG. 1, according to an embodiment.

FIG. 4 is a flowchart illustrating a method of displaying a web page of the server 2000 to which digital media content has been uploaded by the user apparatus 1000, according to an embodiment. The digital media content may be uploaded (S400) to the server 2000 and access information stored (S410) analogously to steps S300 and S310, respectively.

In operation S420, a web page of the server 2000 is accessed by using access information stored in a corresponding content file.

The access information may include an address of the server 2000. The address of the server 2000 refers to information about a content access path via which the user apparatus 1000 may access specific content. An example of the address may include a uniform/universal resource locator (URL). A type and location of a specific information resource is recorded in the URL. Accordingly, according to an embodiment, the user apparatus 1000 may access a web page of the server 2000 with the uploaded content, by using the access information stored in the content file. More specifically, a user may directly access the web page on which the uploaded content has been posted, by using the access information stored in the content file, without having to directly access the server to which the content has been uploaded and search for the corresponding content.

In operation S430, the web page of the server 2000 to which the content has been uploaded and posted by the user apparatus 1000 may be displayed.

Accordingly, the user may easily and quickly transfer content from the user apparatus 1000 to the corresponding server 2000, so as to make it easier to search for uploaded content. Additionally, the user may change the searched for content.

Figure 5:
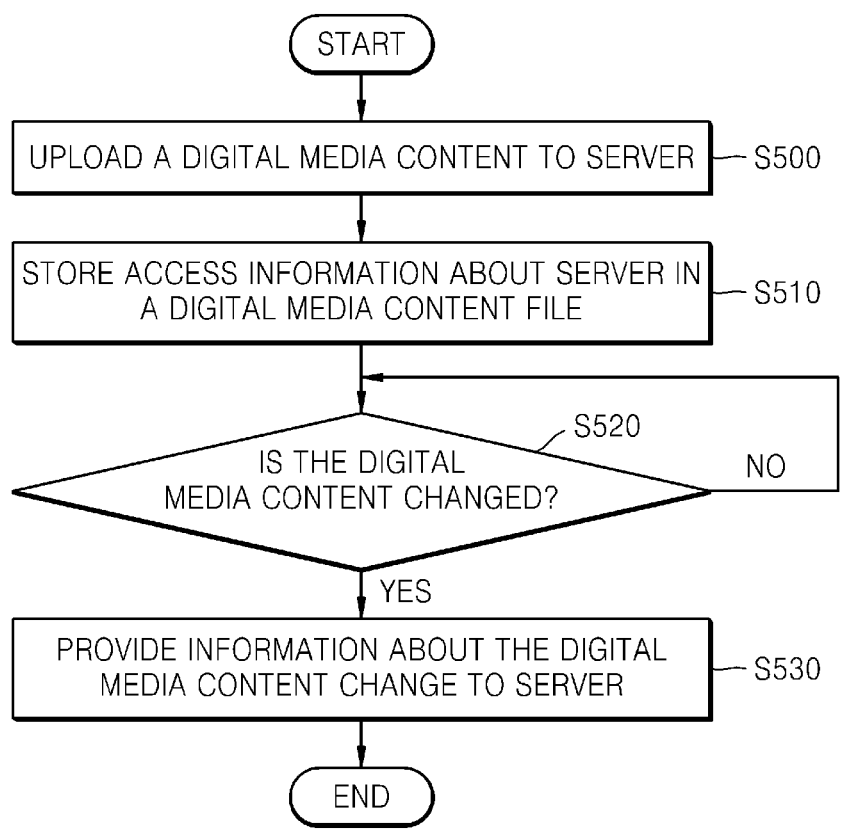
FIG. 5 is a flowchart illustrating a method of synchronizing, by the user apparatus, the digital media content uploaded to the server with changed digital media content, according to another embodiment.

FIG. 5 is a flowchart illustrating a method of synchronizing, by the user apparatus 1000, the digital media content uploaded to the server with changed digital media content, according to another embodiment. The digital media content may be uploaded (S500) to the server 2000 and access information stored (S510) analogously to steps S300 and S310, respectively.

In operation S520, in the user apparatus 1000, it may be determined if the content, which was previously uploaded to the server 2000, has changed.

Even when content is uploaded from the user apparatus 1000 to the server 2000, the content may be still stored in the user apparatus 1000. The content stored in the user apparatus 1000 may undergo an image processing process such as white balance adjustment or color compensation. In this case, the content may be deemed changed. Additionally, when content is deleted, the content may be deemed changed. Additionally, when content is updated, the content may be deemed changed.

In operation S530, when the content is changed (YES at S520), the user apparatus 1000 may provide information about the content change to the server 2000.

If the user apparatus 1000 uploads content to the server 2000, and then, the stored content is changed in the user apparatus 1000, the content in the user apparatus 1000 becomes different from the content uploaded to the server 2000. Accordingly, the user apparatus 1000 provides information about the content change to the server 2000, so that the content in the server 2000 may be synchronized with the content in the user apparatus 1000.

The information about a content change may include at least one of the changed content, an updated version of the content, or a latest update time.

The user apparatus 1000 may provide the information about a content change to the server 2000, by using access information that includes the address of the server 2000, which is stored in the content file, in operation S510. FIGS. 11 and 12 are respectively diagrams and a flowchart illustrating an example of content synchronization.

If the content is not changed, it is not necessary to synchronize the user apparatus 1000 with the server 2000.

FIG. 6 is a flowchart illustrating a method of managing, by the user apparatus 1000, digital media content if there is a change in the server to which the digital media content has been uploaded, according to another embodiment. The digital media content may be uploaded (S600) to the server 2000 and access information stored (S610) analogously to steps S300 and S310, respectively.

In operation S620, it may be determined if the access information, stored in the content file in operation S610, is changed. According to an embodiment, the access information of the server may include at least one of the number of servers to which the content is uploaded or an address of the servers to which the content is uploaded. For example, if the user apparatus 1000 additionally uploads the content to a different server in operation S600 (e.g., the server 3000), or if content is deleted from the server 2000 to which the content is already uploaded in operation S600, the number of the servers to which the user apparatus 1000 uploaded the content and the addresses of the servers to which the content is uploaded is different. Accordingly, the access information of the server, which is stored in the content file in operation S610, may be changed, for example, an address of a server may be added or deleted and the number of servers may be increased or decreased.

In operation S630, if the access information, which is stored in the content file, is changed, the access information may be updated. For example, If the user apparatus 1000 additionally uploads the same content to a server that is different from that in operation S600 (e.g., the server 3000), the number of the servers increases by one from the existing access information stored in S610, and an address of the other server 3000 may be added. As another example, if the content already uploaded to the server of operation S600 is deleted, the number of the servers decreases by one from the existing access information stored in S610, and an address of the server may be deleted. That is, referring to FIGS. 12 through 13, a process of updating access information of the server, which is stored in the content file, is described.

FIG. 7 is a block diagram illustrating a user apparatus 700a for managing digital media content, according to an embodiment.

As illustrated in FIG. 7, the user apparatus 700a may include a communication unit 710, an access information management unit 720, a storage unit 730, and a control unit 740. However, the illustrated units are not essential elements of the various embodiments. The user apparatus 700a may be implemented by using more or less units than those shown in FIG. 7.

The communication unit 710 may include one or more units for communication between the user apparatus 700a and the server 2000. For example, the communication unit 710 may include a mobile communication module, a wireless internet module, a wired internet module, a local area network (LAN) module, a location information module, or other modules.

The mobile communication module transmits and receives a wireless signal to and from a base station or the server 2000 on a mobile communication network. The wireless signal may include a voice call signal, a video phone call signal or various forms of data used to transmit and receive text or multimedia messages.

The communication unit 710 may upload content to a server, such as the server 2000 or 3000. According to an embodiment, the communication unit 710 may upload a content file which includes access information to the servers 2000 or 3000.

The access information management unit 720 may store access information, about the servers to which content has been uploaded, in a content file in which the content is stored. According to an embodiment, the access information refers to information about the server to which content is uploaded by the user apparatus 700a. For example, the access information may include at least one of the number of servers to which the content is uploaded or an address of the servers to which the content is uploaded. According to another embodiment, if the content is additionally uploaded to a different server, or if the uploaded content is deleted from the server, the access information stored in the content file may be updated.

The storage unit 730 may store a content file which includes access information. The storage unit 730 may also store access information. Additionally, the storage unit 730 may store metadata regarding the content.

Figure 8:
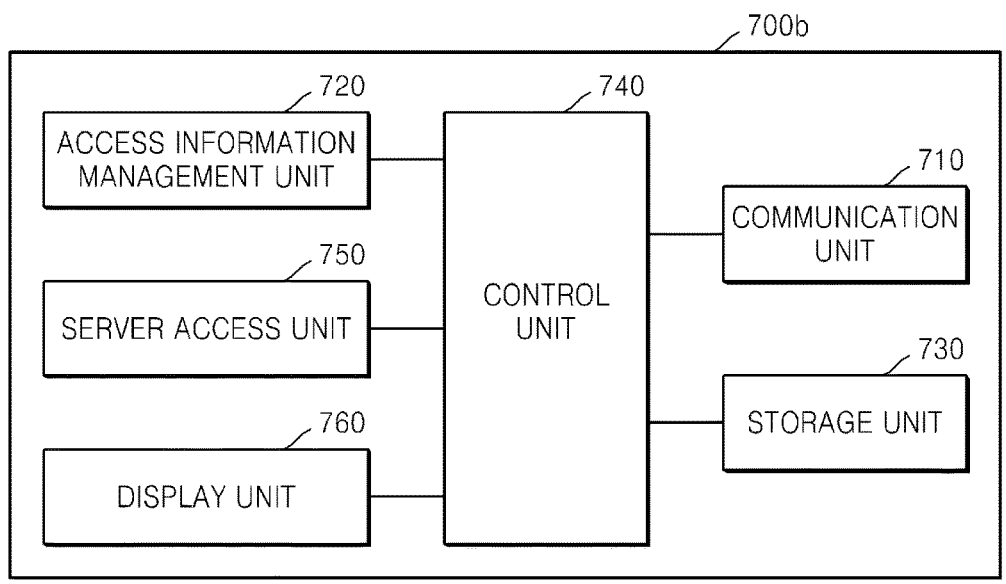
FIG. 8 is a block diagram illustrating a user apparatus for displaying a web page to which digital media content has been uploaded, according to an embodiment.
Figure 9:
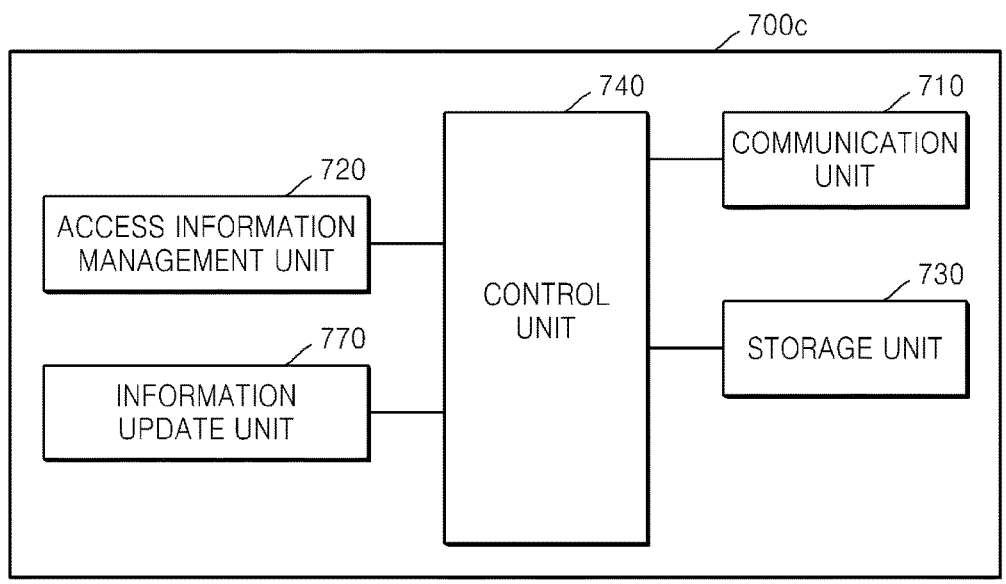
FIG. 9 is a block diagram illustrating a user apparatus for synchronizing digital media content uploaded to the server with changed digital media content, according to another embodiment.

The control unit 740 may control operations of one or more of the communication unit 710, the access information management unit 720, a storage unit 730, a server access unit 750 (FIG. 8), a display unit 760 (FIG. 8), or an information update unit 770 (FIG. 9).

A user input unit, such as the manipulation unit 200, generates input data so that a user may control an operation of the user apparatus 1000. The user input unit may include a key pad, a dome switch, a touch pad, which may be a capacitive overlay type, a resistive overlay type, an infrared beam type, a surface acoustic wave type, an integral strain gauge type, or a piezo-electric type, a jog wheel, or a jog switch, but is not limited thereto. In particular, a touch pad, which forms a structure interlayered with a display unit (e.g., the display unit 760), may be called a touch screen. The user input unit may be implemented in any form that allows input by a user, such as a touch screen or various physical user interfaces (PUIs) such as a keypad, a wheel, or a jog dial.

FIG. 8 is a block diagram illustrating a user apparatus 700b for displaying a web page of the server 2000 to which digital media content has been uploaded, according to an embodiment. The user apparatus 700b in one example includes the communication unit 710, the access information management unit 720, the storage unit 730, the controller 740, a server access unit 750, and a display unit 760.

The server access unit 750 may access a web page of the server 2000 to which content is uploaded, by using the stored access information.

The server access unit 750 may access a web page of the server 2000, on which the content has been uploaded or "posted," by using access information such as the address of the server 2000, which is stored in a content file. The access information is an address of the web page, and may be a uniform resource locator (URL). The server access unit 750 may include at least one of a mobile communication module, a wireless internet module, or a wired internet module. The display unit 760 may display a web page of the server 2000, accessed by the server access unit 750, on the user apparatus 700b.

The display unit 760 may include at least one of a liquid crystal display (LCD), a thin-film transistor-liquid crystal display (TFT-LCD), an organic light-emitting diode (OLED), a flexible display, a three-dimensional (3D) display, or an electrophoretic display. According to an embodiment, the web page of the server 2000, accessed by the server access unit 750, may be displayed on the user apparatus 700b. Content uploaded by the user apparatus 1000 may be posted on the web page of the accessed server 2000. For example, a user may directly access the server 2000 to which the content is uploaded and directly move to the web page of the server 2000 on which the content is posted, by using the access information stored in the content file, without having to directly search for the content.

FIG. 9 is a block diagram illustrating a user apparatus 700c for synchronizing digital media content uploaded to a server 2000 with changed digital media content, according to another embodiment. The user apparatus 700c in one example includes the communication unit 710, the access information management unit 720, the storage unit 730, the controller 740, and an information update unit 770.

If the content is changed in the user apparatus 700c, the information update unit 770 may provide information about the content change to the server 2000, by using access information stored in the access information management unit 720.

The information about the content change may include at least one of a change in the content, an updated version of the content, or a latest update time. For example, information only about the change in the content may be directly supplied to the server 2000 by using the access information of the server 2000 (e.g., the address of the server 2000), and the change is reflected in a content file on the server. Thus, the contents may be synchronized. Otherwise, the content file is uploaded to the server 2000, and thus, the contents may be synchronized.

FIG. 10 is a diagram illustrating a configuration of an image content file 200, according to an embodiment, as an example of digital media content.

The image content file 200 may include a header unit 210, a main image data unit 220, and a thumbnail image data unit 230. However, a configuration of the image content file 200 is not limited to the configuration of FIG. 10, and various changes may be made thereto.

The main image data unit 220 is a part which contains image data. According to an embodiment, the main image data unit 220 is a part of the image content file 200 in which the content is stored.

If the user apparatus 1000 is a digital photographing apparatus 201 as in FIG. 2, the header unit 210 may contain data such as data indicating a manufacturer or a model name of the digital photographing apparatus 201. If the user apparatus 1000 is a digital photographing apparatus 201, the header unit 210 may further contain data such as a date and time of photographing, a shutter speed, a value of an iris, or a zoom ratio. The header unit 210 may also contain thumbnail image data, such as a thumbnail image (e.g., an image in which a main image stored in the main image data unit has been downsized).

The thumbnail image data unit 230 is a part which contains image data (e.g., thumbnail image data) that may be used to display an image on the display unit 80 of the digital photographing apparatus 201 by displaying the corresponding thumbnail image.

According to an embodiment, content management information 240 may be stored in the header unit 210 of the image content file 200. The user apparatus 1000 may be aware of access information about the content, by using the content management information 240 stored in the image content file 200. As an example, when content is uploaded to a server by the user apparatus 1000, if the content is changed in the access information and the user apparatus 1000, the content management information 240 may include information about the change in the content (e.g., the access information).

Figure 11A:
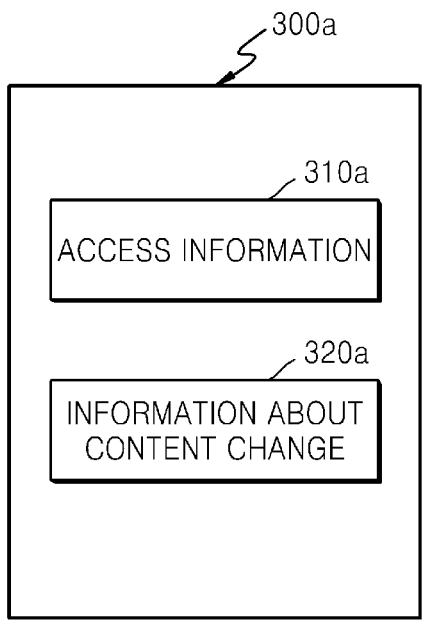
FIGS. 11A and 11B are diagrams illustrating a configuration of content management information of the image content file according to an embodiment, as an example of the digital media contents.
Figure 11B:
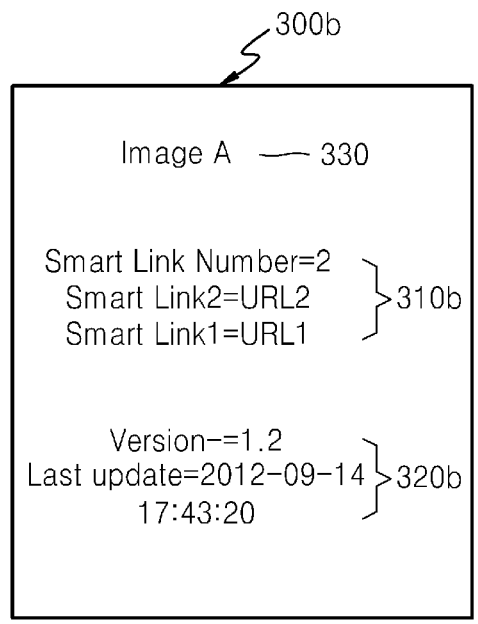
Figure 12:
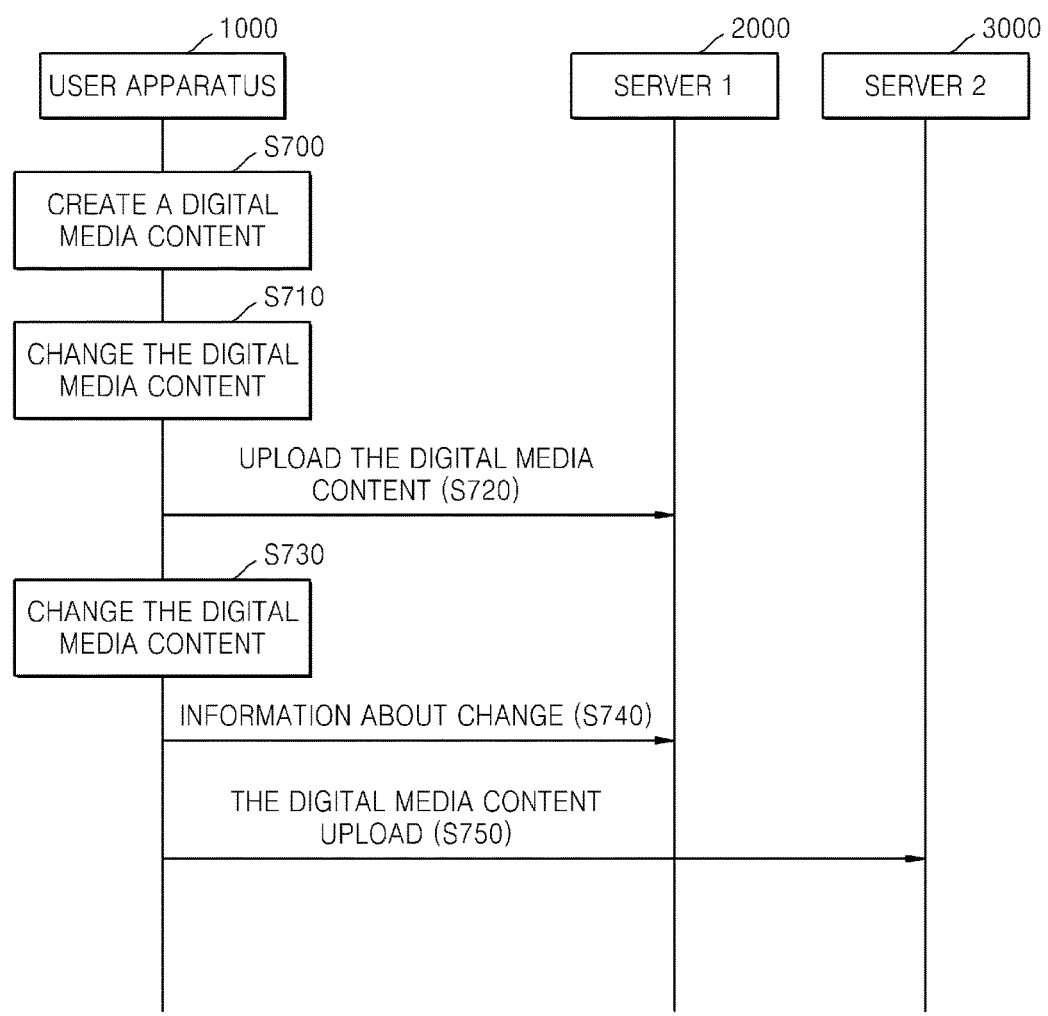
FIG. 12 is a flowchart illustrating a method for synchronization of digital media content between the user apparatus and the server of FIG. 1, according to another embodiment.

FIGS. 11A and 11B are diagrams illustrating example configurations of content management information 300a and 300b of the image content file 200, according to an embodiment, as examples of the content management information 240.

The content management information 300a may include at least one of access information 310a or content change information 320a. The content management information 300b may include at least one of access information 310b, content change information 320b, or an image 330 ("Image A").

According to an embodiment, the access information 310a may be used so that the user apparatus 1000 provides a web page of the server to which the content is uploaded. Additionally, as illustrated in FIG. 11B, the access information 310b may include at least one of the number of servers to which the content is uploaded ("Smart Link Number") and an address of the servers to which the content is uploaded ("URL1" and "URL2"). Additionally, the user apparatus 1000 may update access information stored in the image content file 200, such as when there is additional uploading of the content or deleting of the uploaded content from the server.

According to another embodiment, if the content is changed in the user apparatus 1000, the user apparatus 1000 provides information about the content change to the server by using access information in order to synchronize the content with content uploaded to the server.

The information about the content change, as illustrated in FIG. 11B as 320b, may include at least one of the changed content (image A, 330), an updated version of the content (e.g., an updated value for "Version"), or a latest update time (e.g., an updated value for "Last update").

According to an embodiment, the content management information 300a or 300b may be stored in the header unit 210 of the image content file 200 in which content is stored.

FIG. 12 is a flowchart for illustrating a method for synchronization of digital media content between the user apparatus 1000 and servers 2000 and 3000, according to another embodiment. Additionally, FIGS. 13A through 13H are diagrams illustrating configuration of content management information 400a, 400b, 400c, 400d, 400e, 400f, 400g, and 400h, respectively, for the method of synchronization of digital media content between the user apparatus 1000 and the servers 2000 and 3000, according to another embodiment.

Referring to FIG. 12, in operation S700, content may be generated from or by the user apparatus 1000.

Figure 13A:
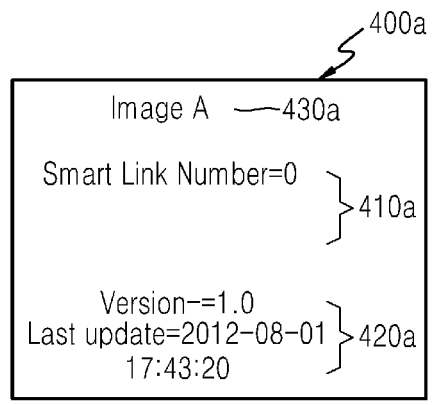
FIGS. 13A through 13H are diagrams illustrating a configuration of content management information for synchronization of digital media content between the user apparatus and the server of FIG. 1, according to another embodiment.

In FIG. 13A, content management information 400a is an example illustrating content management information stored in a content file for the content generated in step S700.

For example, if the content is generated from the user apparatus 1000 on Aug. 1, 2012, and is not uploaded to a server, the number of servers to which the content is uploaded is 0.

Therefore, an example of access information 410a in the content management information 400a is smart link number=0 and there is no address of the server.

When content is first generated from the user apparatus 1000, an upgrade version of the content is 1.0.

Therefore, examples of information about a content change 420a in content management information 400a are Version=1.0 and Last Update=2012.08.01.

An example of a name of a content file 430a of the user apparatus 1000 may be "Image A".

In FIG. 12, in operation S710, the content may be changed from the user apparatus 1000. In this case, the content may be deemed changed.

Figure 13B:
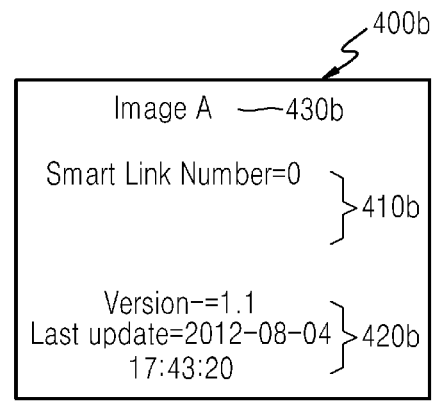

In FIG. 13B, content management information 400b is an example illustrating content management information stored in an upgraded content file.

For example, the user apparatus 1000 may upgrade a version of the content from 1.0 to 1.1 on Aug. 4, 2012. The number of servers to which the content is uploaded is 0.

Therefore, an example of access information 410b in the content management information 400b includes a smart link number=0, and there is no address of the server.

When the content was changed to version 1.1 on August 4th, examples of information about a content change 420b in the content management information 400b are Version=1.1, and Last Update=2012.08.04.

An example of a name of the content file 430b of the user apparatus 1000 may be Image A. In FIG. 12, in operation S720, the content may be uploaded by the user apparatus 1000 to the server 2000.

Figure 13C:
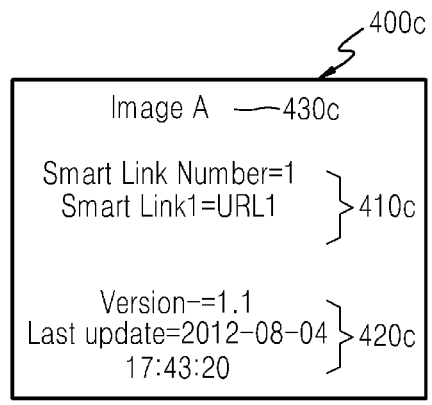

In FIG. 13C, content management information 400c is an example illustrating content management information stored in a content file of the user apparatus 1000. For example, the user apparatus 1000 may upload the content to the server 2000 on Sep. 10, 2012. The number of servers to which the content is uploaded is then 1 and an address of the server 2000 may be a URL1.

Therefore, examples of access information 410c about the content management information 400c are smart link number=1, and smart link1=URL1.

When content was changed to version 1.1 on August 4th in the user apparatus 1000, examples of information about a content change 420c in the content management information 400c are Version=1.1, and Last Update=2012.08.04.

An example of a name of the content file 430c of the user apparatus 1000 for the content management information 400c may be Image A.

Figure 13D:
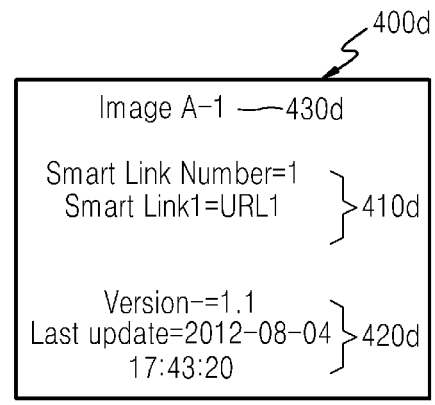

In FIG. 13D, content management information 400d is an example illustrating content management information stored in a content file that has been uploaded to the server 2000.

Since the user apparatus 1000 may upload a content file, which includes content management information, to the server 2000, access information and a content change in the content management information 400d may be the same as in content management information 400c.

Accordingly, access information 410d is the same as access information 410c, and information about a content change 420d is the same as the information about a content change 420c. However, a name of the content file 430d, unlike the a name of the content file 430c, a name of the content file of the server 2000 may be Image A-1.

In operation S730 of FIG. 12, the user apparatus 1000 may change the content, such as via image processing. In this case, the content may be deemed changed.

Figure 13E:
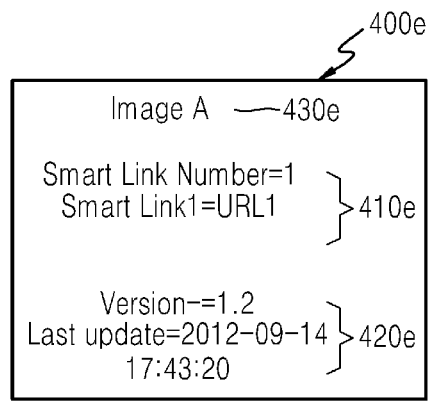

In FIG. 13E, content management information 400e is an example illustrating content management information stored in a changed content file.

For example, the user apparatus 1000 may change the content from version 1.1 to 1.2 on Sep. 14, 2012 for the operation S730.

The number of servers to which the content is uploaded is 1 and an address of the server may be a URL 1 of the server 2000. Therefore, examples of access information 410e in the content management information 400e are smart link number=1 and smart link1=URL1.

When the user apparatus 1000 changes the content to an upgrade version 1.2 on September 14th, examples of information about a content change 420e in the content management information 400e are Version=1.2, and Last Update=2012.09.14.

An example of a name of the content file 430e of the user apparatus 1000 may be Image A.

In operation S740 of FIG. 12, the user apparatus 1000 may provide information about a content change to the server 2000.

Figure 13F:
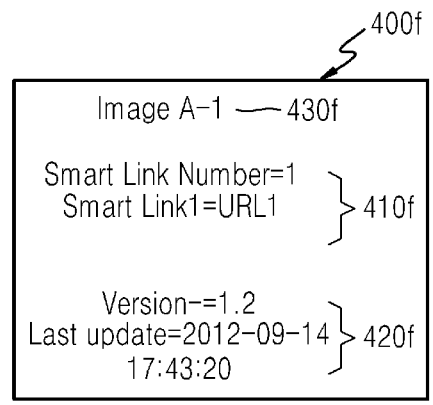

In FIG. 13F, content management information 400f is an example illustrating content management information stored in a content file of the server 2000 after receiving updated content management information.

For example, in content management information 400d, stored in the content file which was previously uploaded to the server 2000 on Sep. 10, 2012, an upgrade version of the content=1.1 and Last Update=2012.08.04.

The user apparatus 1000 changed the content to an upgrade version 1.2 on Sep. 14, 2012. Thus, examples of information about a content change 420f in the content management information 400f should be Version=1.2 and Last Update=2012.09.14.

Therefore, it is necessary to synchronize content between the server 2000 and the user apparatus 1000. That is, in order to synchronize content management information 400f and 400e, information about a content change, that is, an updated version and information about a latest update time may be provided to the server 2000.

In this case, the information may be provided to the server 2000 by using URL1 which corresponds to a server address in the access information of the server 2000.

Therefore, examples of access information 410f in the content management information 400f become smart link number=1, and smart link1=URL1.

Additionally, examples of information about a content change 420*f* in content management information 400*f* become Version=1.2, Last Update=2012.09.14, based on the information about a content change provided by the user apparatus 1000 to the server 2000.

Thus, information about a content change 420*f* in content management information 400*f* may be synchronized with the information about a content change 420*e* in the content management information 400*e* of the user apparatus 1000.

An example of a name of the content file 430*f* of the user apparatus 1000 may be Image A-1.

In operation S750 of FIG. 12, the user apparatus 1000 may upload content to the server 3000.

Figure 13G:
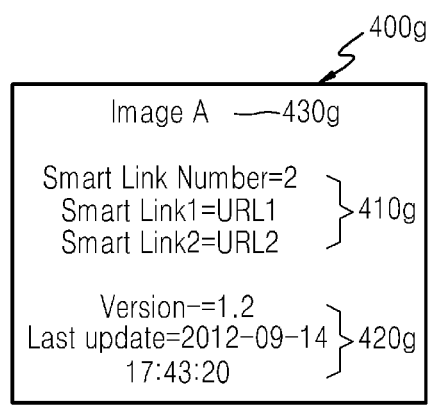

In FIG. 13G, content management information 400*g* is an example illustrating content management information stored in a content file of the user apparatus 1000. For example, the user apparatus 1000 may upload the content to the server 3000 on Sep. 10, 2012. The number of servers to which the content is uploaded is 2 and an address of the server may be a URL 2 of the server 3000.

Therefore, examples of access information 410*g* in the content management information 400*g* are smart link number=2, and smart link2=URL2 may be added.

When the content was upgraded to an upgrade version 1.2 on September 14th, examples of information about a content change 420*g* in the content management information 400*g* are Version=1.2, and Last Update=2012.09.14.

An example of a name of the content file 430*g* of the user apparatus 1000 may be Image A.

Figure 13H:
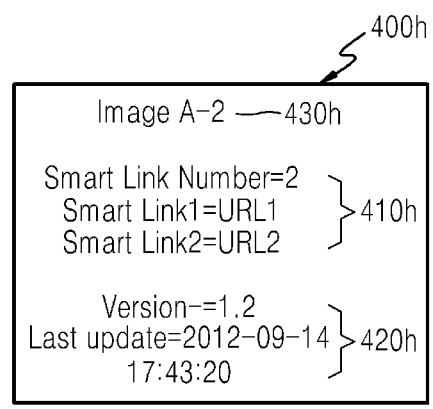

In FIG. 13H, content management information 400*h* is an example illustrating content management information stored in a content file that has been uploaded to the server 3000. Since the user apparatus 1000 may upload a content file, which includes content management information, to the server 3000, access information and content change in content management information 400*h* may be the same as in the content management information 400*g*.

Accordingly, access information 410*h* is the same as the access information 410*g*, and information about a content change 420*h* is the same as the information about a content change 420*g*.

However, a name of the content file 430*h*, unlike the a name of the content file 430*g*, a name of the content file of the server 3000 may be Image A-2.

Figure 14:
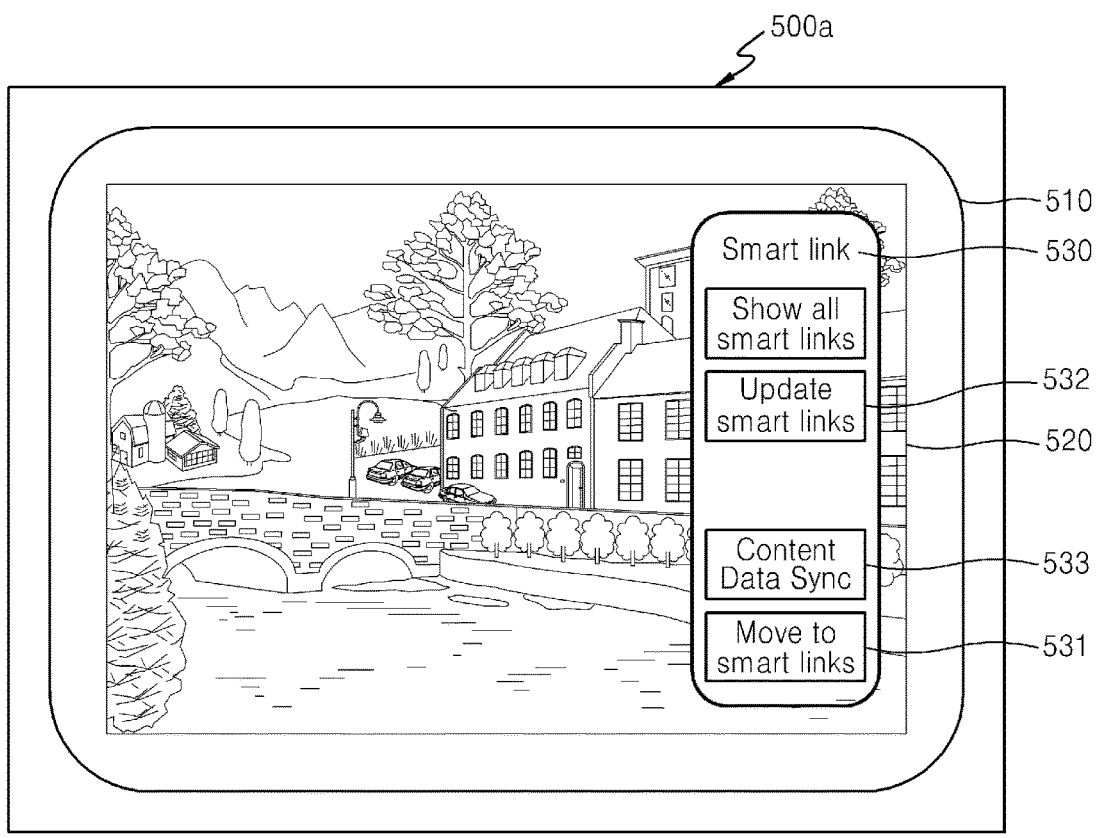
FIG. 14 is an example of a diagram illustrating a display, by the user apparatus of FIG. 1, of a user interface with a content management menu for managing the digital media content, according to an embodiment.

FIG. 14 is an example of a diagram 500*a* illustrating a display , by the user apparatus 1000, of a user interface 510 with a content management menu 530 for managing digital media content, according to an embodiment.

The content management menu 530 is shown overlaid on content 520. According to an embodiment, the content management menu 530 may include "move to smart link" 531 for moving to a web page of a server to which the content 520 is uploaded, and "Update smart links" 532 for, when the content 520 is additionally uploaded or when the uploaded content is deleted from the server, updating the access information stored in the content file. According to another embodiment, if the content 520 is changed, the content management menu 530 may include "Content Data Sync" 533 for synchronizing the content 520 between the server and the user apparatus 1000.

Figure 15:
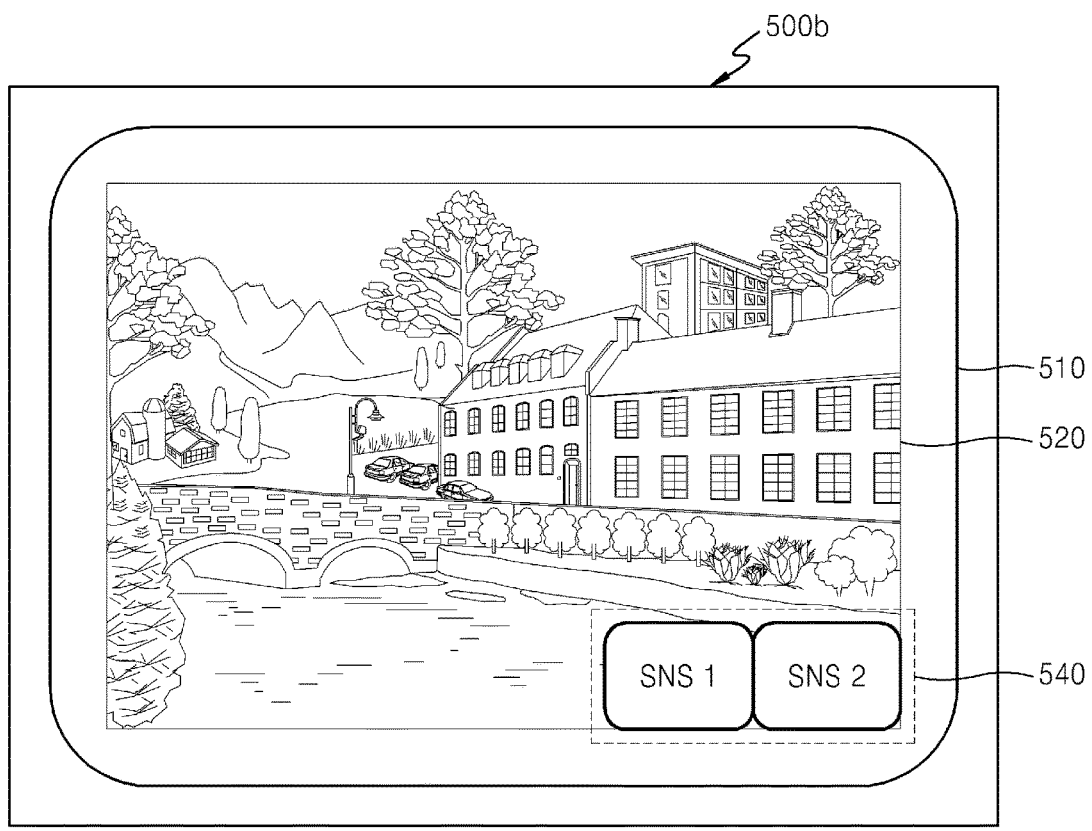
FIG. 15 is an example of a diagram illustrating a display, by the user apparatus, of a user interface 510 with a server access icons that indicate a server to which the digital media content has been uploaded, according to an embodiment.

FIG. 15 is an example of a display 500*b* for displaying, by the user apparatus 1000, of a user interface 510 with a server access icons that indicate a server to which digital media content has been uploaded, according to an embodiment.

If "move to smart link" 531 in the content management menu 530 of FIG. 14 is selected based on a user input, server access icons 540, for indicating a type of a server to which the content is uploaded, may be generated. For example, as illustrated in FIG. 15, when the same content is uploaded to servers SNS1 and SNS2, the server access icons 540 for the servers SNS1 and SNS2 may be displayed with the content 520 of the user apparatus 1000. Thus, when the server SNS1 is selected from the server access icons 540 based on a user input, the user apparatus 1000 may proceed to a web page of the server SNS1 on which the contest is posted. Otherwise, when the server SNS2 is selected, the user apparatus 1000 may easily proceed to a web page of the server SNS2 on which the contest is posted. That is, in the content management menu 530, as a user only searches for a content file in the user apparatus 1000, the user apparatus 1000 may move directly to a web page of at least one or more servers, to which the content is uploaded, by using content management information stored in the content file.

Figure 16:
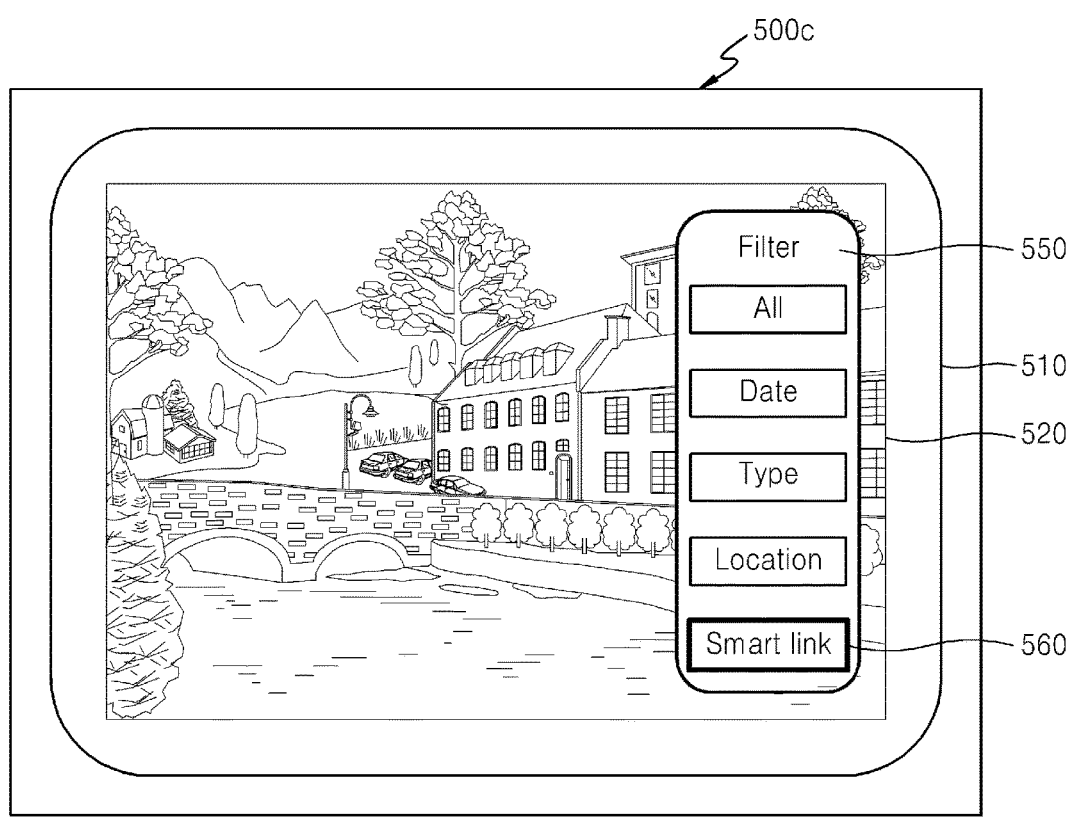
FIGS. 16 and 17 are examples of diagrams illustrating user interfaces for filtering, by the user apparatus, the digital media content based on content management information, according to another embodiment.

FIG. 16 is an example of a display 500*c* for filtering, by the user apparatus 1000, digital media contents based on content management information, according to another embodiment.

As an example of managing content, the control unit 740 of the user apparatus 1000 may filter and display contents according to dates and places, by using a filter such as a content classification menu 550 in FIG. 16. The contents may also be filtered and displayed according to an address of a server to which the contents are uploaded, by adding a Smart Link item 560 to the filter. An example of displaying this is illustrated in FIG. 17.

Figure 17:
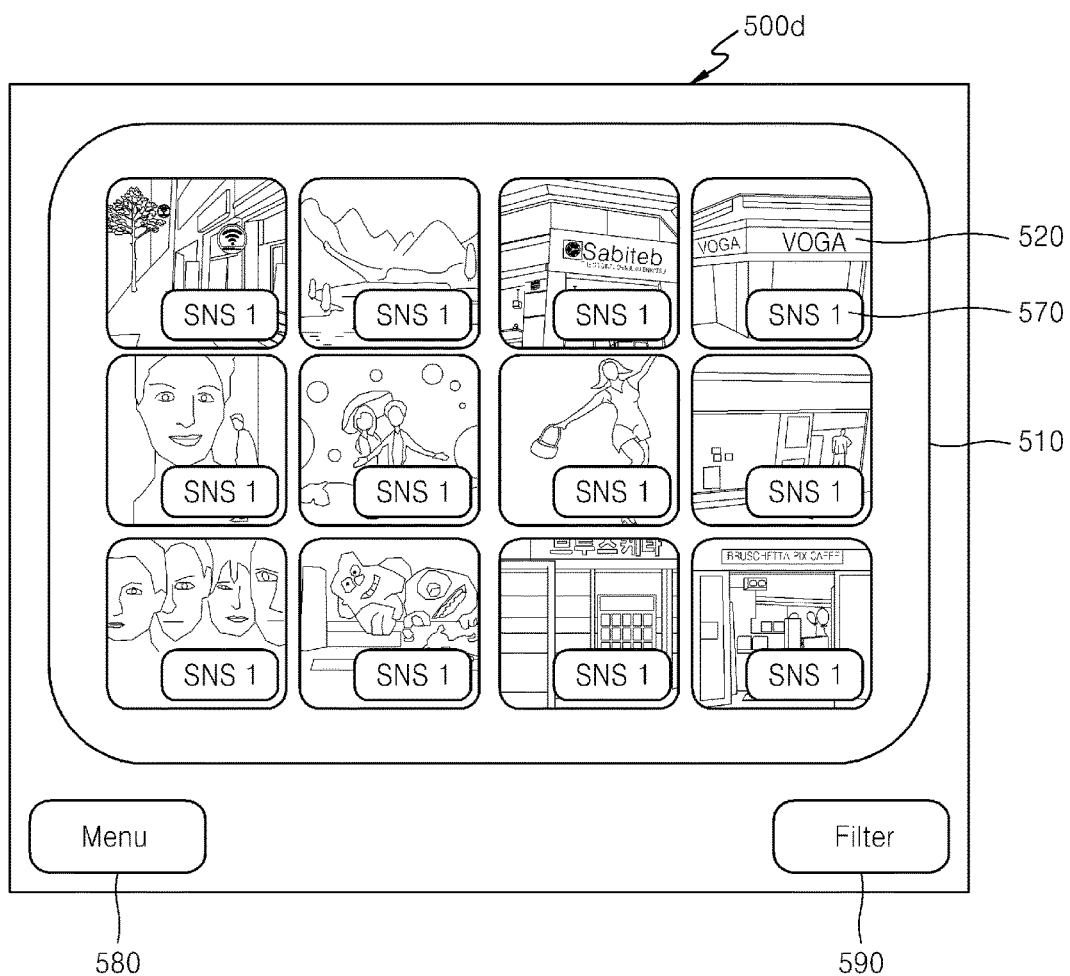

FIG. 17 shows a display 500*d* with content 520 stored in the user apparatus 1000. A server classification icon 570 may be an icon for indicating information about a server to which the content 520 is uploaded. Accordingly, when "Smart link", which corresponds to the Smart Link item 560, is selected based on a user input from the content classification menu 550 in FIG. 16, the user apparatus 1000 may filter and display those contents 520 uploaded to the server SNS1 with the server classification icon 570 of FIG. 17. The user may return to the content management menu 530 by selecting the menu button 580 or may return to the content classification menu 550 by selecting the menu button 590.

As described above, according to the one or more of the above embodiments, when a user apparatus uploads digital content to at least one or more servers, e.g., on the internet, the user apparatus stores access information about the servers in a digital content file, so as to allow directly displaying a web page on the server to which the content is uploaded. Thus, the content uploaded to the server may be easily searched for.

Additionally, according to the one or more of the above embodiments, if the content is changed in the user apparatus, the content uploaded to at least one or more servers may be easily synchronized by using access information.

That is, embodiments allow a user to easily move, search for, and manage the same content posted on the internet from their user apparatus, as described herein, by using a method of operating management information based on the content. Thus, user convenience may be improved.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

In addition, other embodiments may also be implemented through computer readable code/instructions in/on a medium, e.g., a computer readable medium, to control at least one processing element to implement any above described embodiment. The medium may correspond to any medium/media permitting the storage and/or transmission of the computer readable code. Also, using the disclosure herein, programmers of ordinary skill in the art to which the invention pertains may easily implement functional programs, codes, and code segments for making and using the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

Embodiments may be described in terms of functional block components and various processing steps. Such functional blocks may be realized by any number of hardware and/or software components configured to perform the specified functions. For example, embodiments may employ various integrated circuit components, e.g., memory elements, processing elements, logic elements, look-up tables, and the like, which may carry out a variety of functions under the control of one or more microprocessors or other control devices. Similarly, where the elements of embodiments are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, embodiments could employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of embodiments of the invention and are not intended to otherwise limit the scope of embodiments of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of the terms "a" and "an" and "the" and similar referents in the context of describing embodiments of the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of embodiments of the invention unless otherwise claimed. Numerous modifications and adaptations will be readily apparent to those of ordinary skill in the art without departing from the spirit and scope of embodiments.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of embodiments as defined by the following claims.

What is claimed is:

1. A method of managing digital media content, the method comprising:
    storing a digital media content file including a digital media content in a user apparatus;
    transmitting, by the user apparatus, the digital media content file to a server;
    storing access information including an address of the server in the digital media content file stored in the user apparatus, so that the digital media content file comprises the digital media content and the access information;
    when displaying the digital media content, displaying an icon linked to the server in which the digital media content file is stored; and
    if the digital media content is changed by the user apparatus, providing information about the digital media content change to the server by using the access information to update the digital media content file stored in the server,
    wherein the address of the server is a uniform resource locator (URL) address.

2. The method of claim 1, further comprising:
    accessing a web page of the server by using the access information; and
    displaying the web page.

3. The method of claim 1, wherein the access information comprises at least one of a number of servers to which the digital media content has been uploaded and an address of the server to which the digital media content has been uploaded.

4. The method of claim 1, wherein the information about the digital media content change comprises information about at least one of a changed digital media content, an update version, or a latest update time.

5. The method of claim 1, further comprising:
    additionally uploading the digital media content to another server, or deleting the uploaded digital media content from the server; and
    updating the access information stored in the digital media content file.

6. The method of claim 1, further comprising filtering a plurality of digital media content files based on the access information.

7. A user apparatus for managing digital media content, the user apparatus comprising:
    a communicator configured to transmit a digital media content file to a server, wherein the communicator is connected to a network;
    a processor configured to store access information including an address of the server in the digital media content file stored in the user apparatus, so that the digital media content file comprises the digital media content and the access information;
    a storage medium configured to store the digital media content file including the digital media content; and
    a display configured to, when displaying the digital media content, display an icon linked to the server in which the digital media content is stored, wherein the display includes a display panel;
    wherein if the digital media content which is stored in the digital media content file is changed by the user apparatus, the processor controls the communicator to transmit information about the digital media content change to the server by using the access information to update the digital media content file stored in the server, and the address of the server is a uniform resource locator (URL) address.

8. The user apparatus of claim 7, wherein the display is further configured to
    display a web page of the server, and
    the communicator is further configured to access the web page of the server by using the URL address included in the access information.

9. The user apparatus of claim 7, wherein the access information comprises a number of servers to which the digital media content file is uploaded.

10. The user apparatus of claim 7, wherein the information about the digital media content change comprises information about at least one of the changed digital media content, an update version, or a latest update time.

11. The user apparatus of claim 7, wherein, if the digital media content file is additionally uploaded to another server or the uploaded digital media content is deleted from the server, the processor is further configured to update the access information stored in the digital media content file.

12. The user apparatus of claim 7, wherein the processor is further configured to filter the digital media content file based on the access information.

13. A non-transitory computer-readable recording medium for storing computer program code which performs the digital media content management method of claim 1.

* * * * *